United States Patent [19]
Johnson

[11] 3,776,779
[45] Dec. 4, 1973

[54] GELLED BATTERY ELECTROLYTE CONTAINING A POLYGLYCOL POLYMER AND A PROCESS FOR LOCATING SAME WITHIN A LEAD-ACID CELL

[75] Inventor: Bruce L. Johnson, Newport Beach, Calif.

[73] Assignee: Elpower Corporation, Santa Ana, Calif.

[22] Filed: Apr. 28, 1972

[21] Appl. No.: 248,536

[52] U.S. Cl. ................................ 136/157, 136/158
[51] Int. Cl. ................................................ H01m 9/00
[58] Field of Search ....................... 136/157, 158, 26, 136/27, 153–154, 146; 252/315–317

[56] References Cited
UNITED STATES PATENTS

| | | | |
|---|---|---|---|
| 2,762,858 | 9/1956 | Wood | 136/157 X |
| 2,887,522 | 5/1959 | MacKenzie | 136/146 X |
| 3,271,199 | 9/1966 | Beste et al. | 136/157 |
| 3,305,396 | 2/1967 | Rauter | 136/158 X |
| 3,419,431 | 12/1968 | Michaels | 136/26 |
| 3,556,860 | 1/1971 | Amlie | 136/157 |

*Primary Examiner*—Anthony Skapars
*Attorney*—Edward D. O'Brian

[57] ABSTRACT

A gelled battery electrolyte of a non-thixotropic character resistant to cracking and shrinking can be formed utilizing aqueous sulfuric acid, silica serving as a gelling agent for this acid and a polyglycol, preferably polyethylene glycol, as an additive-stablizer for the gel. The amounts of the silica and the polyglycol used will depend upon the physical and electrical properties desired in the battery. Preferably the electrolyte is formed by placing the polyglycol in an inlet to a battery so that it will be mixed with sulfuric acid and the silica as a dispersion of the two is directed into the battery so as to fill the battery. The polyglycol may, also, be located on battery parts prior to filling or a solution of the polyglycol can be injected into the electrolyte solution during filling.

12 Claims, 4 Drawing Figures

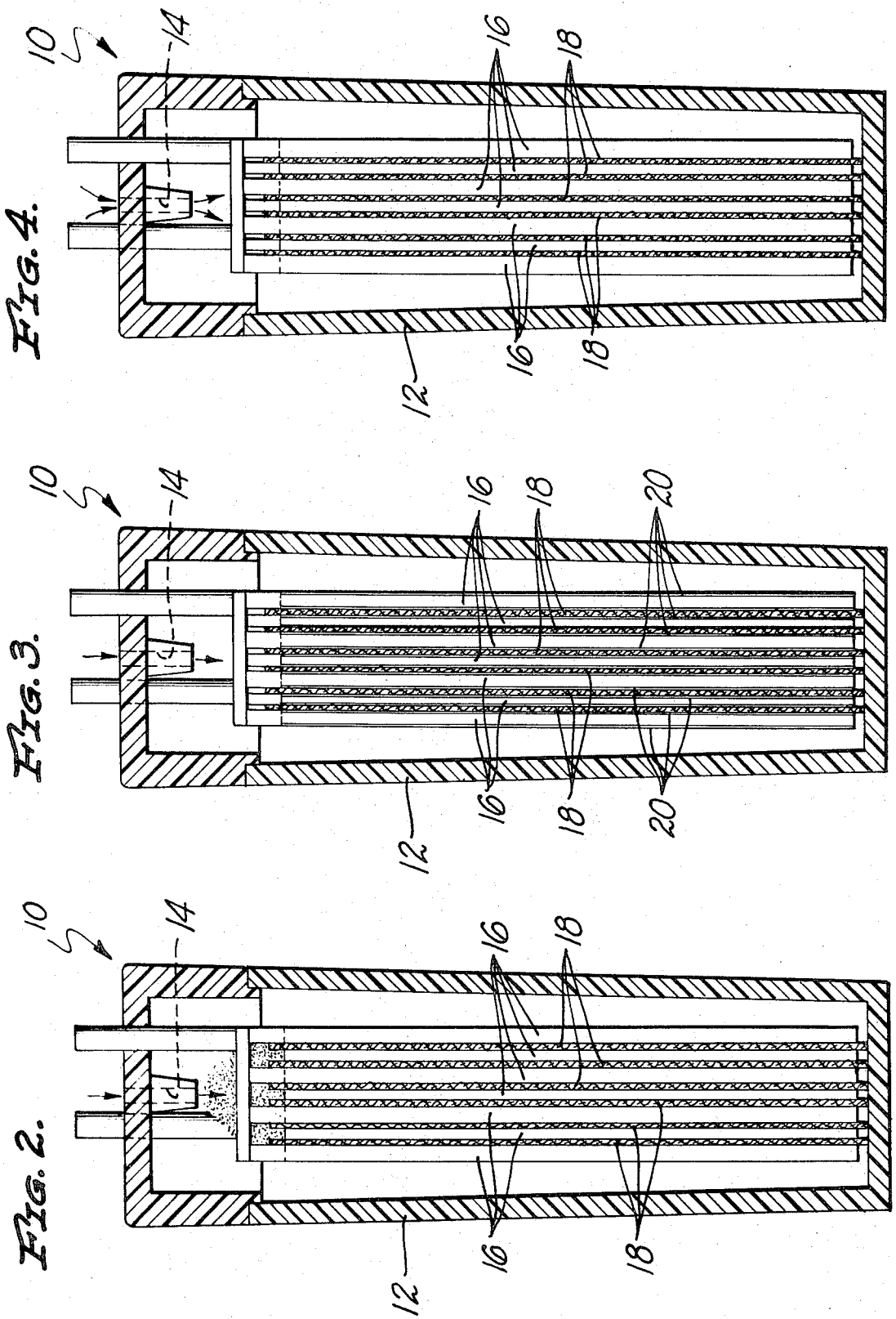

GELLED BATTERY ELECTROLYTE CONTAINING A POLYGLYCOL POLYMER AND A PROCESS FOR LOCATING SAME WITHIN A LEAD-ACID CELL

BACKGROUND OF THE INVENTION

For reasons which are unimportant to the present invention so-called lead-acid batteries employing lead electrodes, separators positioned between these electrodes and a sulfuric acid electrolyte are considered advantageous for many applications. Batteries of this type have been known for many years. As they were originally constructed, such batteries utilized sulfuric acid in the form of a liquid. Many batteries are still constructed in this manner.

Early in the development of lead-acid batteries it was recognized that such use of liquid sulfuric acid as a battery electrolyte was disadvantageous because of the danger of electrolyte spillage and because of the corrosive character of sulfuric acid. Recognition of the problems attendant to the use of a liquid sulfuric acid electrolyte lead to a great many proposals relative to the use of different gelling agents so as to solidify the sulfuric acid in lead-acid cells so that this acid will not escape from a battery during normal conditions of handling and use.

It is considered unnecessary to discuss in this specification all of the different gelling agents which have been proposed and utilized and which are to varying extents being utilized to solidify sulfuric acid electrolytes. Because of its effectiveness without chemical degradation silica has often been proposed and utilized as a gelling agent in the sulfuric acid used in lead-acid cells.

In connection with such utilization of silica, a number of factors have been recognized. One of these is that silica gels are of a thixotropic nature. Because of this, silica-sulfuric acid gels will tend to break down so as to release liquid sulfuric acid if they are subjected to mechanical forces. This can be critical in the case of batteries which are intended to be utilized in applications where such batteries are apt to be moved a great deal and/or apt to be subjected to physical stresses and strains of one sort or another.

It has been recognized that to a degree such physical breakdown of a sulfuric acid electrolyte gel with silica can be combated by increasing the amount of the silica used in the electrolyte. In effect, the greater the quantity of silica employed the greater the physical stability of the gelled electrolyte system. However, increasing of the amount of silica utilized as a gelling agent so as to improve the physical properties of a gel in a battery is disadvantageous because of the effect on the electrical properties of the battery.

In general, the greater the amount of silica utilized the greater the internal resistance within a lead-acid battery between the electrodes and the less the capacity of the battery. An increase in the internal resistance in a lead-acid cell is considered advantageous for several different reasons. In general such an increase tends to shorten the effective life of the battery by decreasing the number of times a battery may be repeatedly charged or discharged without the operation of the battery being seriously or detrimentally affected.

During such repeated charging and discharging gels formed utilizing silica and other related materials have a distinct tendency so as to shrink, crack and otherwise breakdown. As this occurs there is, of course, an effect on battery life and operation. In general it is considered that the greater the quantity of the silica utilized to gel a sulfuric acid electrolyte, the greater the tendency towards such breakdown.

As a consequence of these factors, it has been proposed to add to silica gels various additive-stablizers which are intended to effect the thixotropic properties of such gels so as to render them non-thixotropic and so as to combat within such gels the possibility of gel breakdown as indicated in the preceding. Among such additives which have been proposed in the past are certain plant or naturally occurring and artificially manufactured hydrocolloids. Batteries utilizing silica gelled sulfuric acid electrolytes stablized with at least one of such hydrocolloids are currently being utilized commercially.

It is considered that known procedures for utilizing hydrocolloids stablized silica gelled sulfuric acid electrolytes are disadvantageous because of various manufacturing considerations. These concern the problem of creating an electrolyte as a solution containing the gelling agent and the stablizer and getting such a composition into a battery in a liquid form so that the electrolyte composition completely impregnates the battery without either setting up in a whole or in part prior to and during filling and still having the electrolyte of such a character that it will set up into a solid form within a reasonable period after the battery is filled.

In connection with these factors, it will be realized that a partially formed gel will not adequately flow so as to completely displace the air in the very limited spaces available in a lead-acid cell. It will also be realized that normally a manufacturer will wish to handle a battery after it has been filled within a relatively short time period. If a battery is moved after being filled, but before the electrolyte in such a battery has set up there is significant danger of electrolyte spillage and there is danger that irrevocable damage may be inflicted upon the gel structure within the electrolyte which is being formed or setting up at the time such a battery is moved.

Known types of stabilizers for silica-gelled sulfuric acid electrolyte are also considered disadvantageous for other reasons than pertain to manufacturing considerations. It is presently considered that the quantities of such stablizers which have to be utilized in order to effectively combat the thixotropic character of silica-gelled sulfuric acid electrolytes and in order to effectively combat the tendency of such electrolytes to crack and shrink during use are sufficiently great so as to tend to detrimentally effect the properties of batteries utilizing electrolytes gelled with such stablizers. In short, it is considered that the use of known hydrocolloid stablizers in effective amounts to provide a gelled electrolyte stablized against physical breakdown or the like will tend to detrimentally increase the internal resistance within a battery. This in turn is considered to be disadvantageous as indicated in the preceding as effecting battery life.

SUMMARY OF THE INVENTION

From this discussion it will be apparent that there is an existant need for improvement in the art pertaining to gelled sulfuric acid electrolytes as are utilized in lead-acid cells. In a broad sense the invention set forth in this specification and claimed in the appended claims is intended to provide a significant degree of such improvement. More specifically, however, the present invention is concerned with providing an improvement in connection with the composition of a silica-gelled sulfuric acid electrolyte so as to primarily improve the physical properties of such a gelled electrolyte and in connection with manufacturing techniques as are involved in positioning such an electrolyte and a stablizer as herein set forth or a related stablizer in an operative location as, for example, within a lead-acid cell.

In accordance with this invention an improvement in a sulfuric acid electrolyte gelled with silica is achieved through the use of a comparatively small or minor amount of a polyglycol polymer, preferably a polyethylene glycol polymer, as an additive to stablize the gel created as a result of the use of the silica so that the gel is substantially non-thixotropic, solid-like in character and is of such a nature that it will not significantly shrink, crack or otherwise breakdown during continued, repeated use. Such an additive or a related additive may be utilized in accordance with this invention by positioning the additive in place at the top of a battery cell or similar structure so that it is contacted and mixed with a sulfuric acid electrolyte containing silica as such a composition is located within the cell. It is also possible to locate a small quantity of the additive-stablizer as a surface film on the plates and separators within a battery where it will be contacted by sulfuric acid containing silica during filling or by injecting a solution of the polymer into the sulfuric acid containing silica as the acid is being located in an operative position.

BRIEF DESCRIPTION OF THE DRAWING

A summary of this type is inherently incapable of indicating many facets and features of an invention which are important to the invention itself and to the utilization of the invention. Also a summary of this type cannot normally indicate many advantages of an invention because of its brevity. For these reasons the foregoing summary is best considered in conjunction with the remainder of this specification, the appended claims and the accompanying drawing in which:

FIG. 2 is a diagrammatic, cross-sectional view indicating a presently preferred method of adding a gel stablizer to a sulfuric acid electrolyte containing silica during the manufacture of a lead-acid battery;

FIG. 3 is a diagrammatic, cross-sectional view corresponding to FIG. 2 indicating another manner in which such an additive-stablizer can be utilized with a solution containing silica in sulfuric acid during the manufacture of a lead-acid battery; and FIG. 4 is a diagrammatic, cross-sectional view similar to FIGS. 2 and 3 indicating still another manner in which an additive-stablizer can be utilized with a solution containing a silica gelling agent in sulfuric acid during the manufacture of a lead-acid battery.

Figure 1:
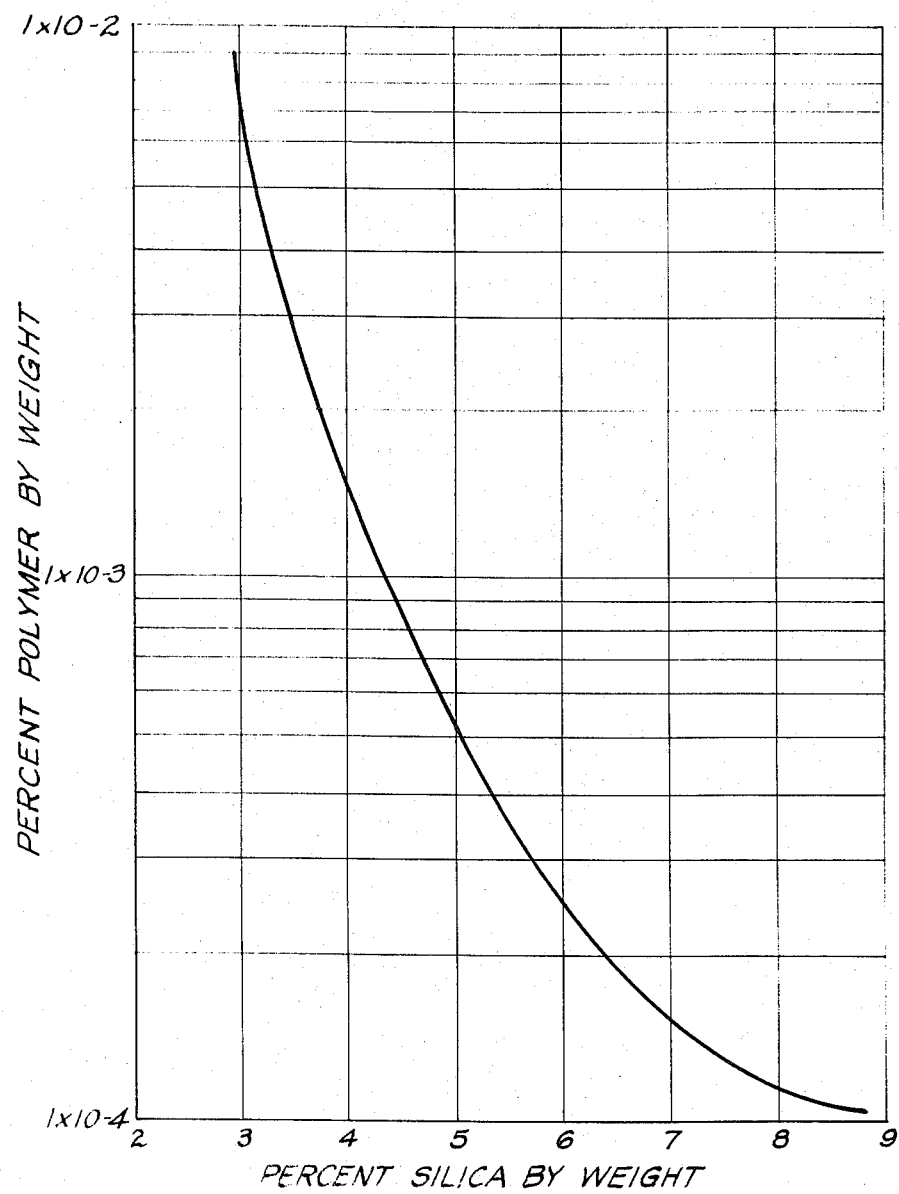
FIG. 1 is a curve showing the relationship between the amount of silica and the amount of a particular additive-stablizer which should be utilized with sulfuric acid of specific concentration in creating an electrolyte in accordance with this invention.

No view is shown in the drawing of a completed battery containing a gelled electrolyte stablized in accordance with this invention since the appearance and character of batteries employing gelled electrolytes are well-known in the battery art.

In considering this specification and the drawing it should be kept in mind that no specific figure of the drawing and that no specific portion of the specification standing alone defines or limits the invention. This is because the invention as explained in this specification with reference to the drawing involves certain intangible concepts as are set forth and defined in the claims. These concepts may be utilized in different manners with different compositions through the use or exercise of routine skill in the battery field on the basis of the disclosure embodied within this specification and in the drawing.

DETAILED DESCRIPTION

Sulfuric acid as used in an electrolyte of this invention is conventional sulfuric acid of the type commonly used in known lead-acid batteries. Such acid may contain extremely minor or trace quantities of contaminants such as are normally present in acid utilized in such batteries. In addition, such acid may contain minor quantities of other ingredients such as are occasionally added to the electrolytes in lead-acid cells in an effort to improve the battery performance or life provided that such secondary additives do not interfere with the action of the silica and the polyglycol utilized in accordance with this invention. It is considered that normally there will be no such interference with conventional additives of the type contemplated by this discussion.

The concentration of the sulfuric acid utilized should normally be within the ranges of concentrations conventionally utilized in lead-acid cells. Since the present invention pertains to gels formed utilizing sulfuric acid as this acid is conventionally employed in a lead-acid battery it is not considered necessary to discuss in extreme detail such concentrations in this specification. Generally, the sulfuric acid utilized in practicing the present invention will have a specific gravity of from about 1.200 to about 1.320. Concentrations within this range are normally used for reasons pertaining to conductivity, danger of undesired reactions and the like.

The silica utilized in practicing the present invention is conventional silica in a finely divided form such as is commonly utilized in forming gels with sulfuric acid, in thickening various compositions and the like. This silica is preferably in the form of submicroscopic silica amorphous particles of a colloidal character. Silica of the type preferably used is preferably produced by the flame hydrolysis of silicon tetrachloride in the gas phase at about 1,000°C. or by similar processes yielding substantially the same product. It is considered that this silica consists of particles averaging from about 70 to about 500 angstroms in diameter. Normally this silica will have branched chains and a surface area of from 400 $m^2/g$ to 50 $m^2/g$. Commercial colloidal silica of the type contemplated for preferred use in accordance with the invention is a stable item of commerce.

The amount of such silica utilized should preferably be determined by considering the gel strength desired in a particular battery and by taking into consideration the decrease in battery life and capacity tending to result from the use of increasing amounts of silica as a consequence of the silica tending to increase the internal resistance within a cell. In general, just sufficient silica should be utilized to give the desired physical strength necessary to prevent electrolyte breakdown or movement during the expected normal handling of the battery. Thus, a battery which is not to be subjected to significant forces or handling can normally be created utilizing less silica than a battery which is to be utilized in a location where it is to be subjected to repeated vibrations, significant handling or the like.

In determining the amount of silica to be utilized for a particular application a manufacturer will normally decide on a specific amount on the basis of routine tests. Such tests will normally involve making up a series of batteries and testing them under prospective use conditions. It has been found on this basis that sulfuric acid gelled electrolytes gelled with less than 3 percent by weight of a colloidal silica as indicated do not normally have a desired degree of solidity or gel strength to prevent electrolyte spillage or breakdown in most commonly utilized lead-acid cells. It has, also, been found that if such electrolytes contain more than 8.5 percent by weight of a colloidal silica as indicated that the internal resistance within a lead-acid battery will be increased to a point that battery life and capacity is lowered to a commercially undesired amount even though the electrolyte will be of a comparatively solid character.

It is to be recognized that these numerical limits are not precise limits in the sense that they indicate precise inflection points on a curve or the like. The changes in gel strengths and in internal resistance at the extremes of this numerical range tend to be relatively gradual. Batteries which may be useable for some purposes or which at least may be considered as being useable for some purposes can be constructed utilizing amounts of silica slightly above or below the range indicated.

In the past a problem which has made it difficult to determine the precise amount of silica to be used in gelling a sulfuric acid electrolyte is related to the thixotropic properties of gels of silica and sulfuric acid. The application of "use" encountered forces such as forces derived from violent shaking will tend to breakdown the structure of a silica gelled sulfuric acid electrolyte unless an additive gel stablizer is used in such an electrolyte. For this reason the testing to determine the precise amount of silica to be utilized in a gelled electrolyte in accordance with this invention should be carried out with a gel containing a stablizer as herein described.

FIG. 1 of the drawing shows a curve indicating the minium amounts by weight of a particular polyglycol—polyethylene glycol having an average molecular weight of 3,000 which should be utilized with various percents by weight of colloidal silica as indicated in gelling a conventional commercial 1.31 specific gravity aqueous sulfuric acid electrolyte. If quantities of the polyglycol falling to the lower left of the curve of FIG. 1 are used so that the composition does not contain at least an amount of silica and polyglycol as indicated by a point on the curve of the electrolyte will in general have undesired thixotropic characteristics and will not be adequately stablized so that it will not breakdown in response to physical forces and will not undesirably tend to crack or shrink or the like during use. On the other hand, if an amount of the polyglycol is used which falls to the upper right in the curve so that a particular electrolyte will contain silica and polyglycol in excess of the amount indicated by the curve there will be an uneconomic use of material which may result in an undesired increase in battery internal resistance.

From the curve shown in FIG. 1 it will be apparent that a gelled electrolyte in accordance with this invention should normally contain about 0.065 to about 0.0001 percent by weight of a polyglycol in stablizing a particular gelled acid electrolyte formed from sulfuric acid of the concentration indicated and containing an amount by weight of silica falling within the range indicated in the preceding discussion. Curves such as the curves shown in FIG. 1 will vary slightly when the acid used is of a different specific gravity than the particular acid noted and when other polyglycols than the specific noted polyglycol are noted as a stablizer. However, all of such curves for such various different acids and polyglycols are considered to be approximately of the same or nearly the same character as the curve shown in FIG. 1.

In practicing this invention a wide variety of different polyglycols can be utilized. Because of commercial availability and effectiveness it is presently preferred to utilize a polyethylene glycol having a molecular weight of from about 200 to about 6,000. Those polyethylene glycols having a molecular weight from about 200 to about 800 are normally clear, colorless liquids while polyethylene glycols having molecular weights in excess of from about 800 to about 6,000 are white, somewhat waxy type solids. It is considered that both of such types of polyethylene glycols can be utilized with this invention.

It is also considered that it is possible to utilize with the invention polyglycols made from homologs of ethylene oxide having the formula

in which R is an alkyl radical which are soluble in sulfuric acid as used in a battery. All of these polyglycols are normally considered to be glycol condensation products. In fact they are normally produced by ring-scission polymerization of corresponding oxides. All polymers of the type herein indicated are normally classified together and are considered to have the same general class of physical properties.

The utilization of a polyglycol stablizer in forming a gelled electrolyte in accordance with this invention can be accomplished in any one of a number of different manners as indicated in FIGS. 2, 3 and 4. In each of these figures a single battery cell 10 is indicated. Each of the battery cells 10 includes a conventional nonconductive housing 12 having a restricted filling opening 14 used in supplying electrolyte to positive and negative conventional lead electrodes 16 which are held separate and apart from one another by one or more conventional separators or spacers 18.

In the preferred manner of practicing this invention a gel stablizer in the powdered form such as a solid polyethylene oxide as indicated in the preceding discussion or any other similar stablizer is located as a quantity of powdered material 20 on top of the separators 18 immediately within the filling opening 14 after the cell 10 has been assembled. The size of the particles of such powder is not considered critical. When a fluid dispersion of a sulfuric acid electrolyte created and maintained in accordance with conventional practice so as to contain colloidal silica is injected through the opening 14, the dispersion will contact the material 20 so as to tend to place it in a solution and mix it reasonably thorough with the electrolyte within the interior of the cell 10. In this utilization the normal fluid agitation accompanying filling will create a reasonably thorough distribution of the stablizer within the electrolyte.

In utilizing this method of filling a battery in accordance with this invention, the acid dispersion containing silica will be in a fluid form as this dispersion is injected through the opening 14, either because a gel structure is not formed within it or because in a gelled structure formed within it will be broken down by physical forces applied to the dispersion in injecting it. In this connection it will be recalled that silica-gelled sulfuric acid mixtures are thixotropic unless an additive or stablizer is used with them. When the stablizer is a polyethylene glycol as indicated in the preceding, the quantity of such stablizer used as a quantity 20 will be determined by the internal geometry within the cell 10.

The electrodes 16 and the spacers 18 employed in this cell 10 are normally of a microporous or similar character. Because of this character they will normally tend to filter out any gelling agents or stablizers used in the electrolyte to at least a significant degree so that they will contain relatively ungelled and unstablized "free" aqueous sulfuric acid. The amount of acid taken up by these electrodes 16 and these spacers 18 will vary to comparatively wide limits depending upon the specific electrode and spacer structures used or desired by the manufacturer. Broadly, it is considered that from about 10 to 85 percent of the acid placed within a battery will tend to be filtered out or absorbed by the electrodes and the separators used. The lower figure is usually encountered when non-absorbent spacers are utilized and the upper figure is normally encountered when the separators or spacers have an extreme degree of absorbency.

As the result of this taking up of free acid into battery structures, the amount of the space available within a cell such as the cell 10 for a stablized gelled electrolyte if desired is comparatively limited. In essence this is the "free" space left over or remaining outside of the electrodes and the separators although to a degree the gelled phase of an electrolyte in a battery will tend to enter holes, cracks and crevices and the like in the electrodes and in the separators. Because of this, the amount of the polyglycol or other additives used should be determined with reference to the amount of the electrolyte necessary to fill this available or "free" space.

Thus, in utilizing the curve of FIG. 1, the amount of sulfuric acid which will be taken up into battery plates and separators should be disregarded in determining the amounts of silica and polyglycol to be used, as for example, in the quantity of material 20. This can be illustrated by referring to the specific cell 10. If the electrode 16 and the spacers 18 in this cell will take up half of the quantity of liquid sulfuric acid (ungelled) necessary to fill this cell and if the capacity of this cell for such acid is 200 ml., the amounts of silica and polyglycol must be related to the 100 ml. of acid which remain in the so-called "free" space so that this acid will contain an amount by weight of silica and an amount by weight of polyglycol as indicated by the curve of FIG. 1. Thus, in this example there would be 100 ml. of free space and the amount of silica and polyglycol used should be with reference to the acid occupying this space.

In another manner of practicing this invention as indicated in FIG. 3, the amount of the stablizer used is calculated in the same manner and the stablizer is then placed in solution and sufficient of the solution is then applied to the electrodes 16 and/or the spacer 18 in the form of films 20 which are allowed to dry so that the polyglycol will be held in place on these parts prior to the cell 10 being assembled. Polyethylene glycols as indicated can be easily placed in solution in water and such solutions may be easily applied to electrodes and spacers which are air dried prior to cell assembly. Normally such solutions will be located in place by painting or similar coating techniques of a conventional character.

In this manner of practicing the invention indicated in FIG. 3 a dispersion of silica in sulfuric acid is injected into the cell 10 in the same manner as such dispersion is used in connection with the process described with reference to FIG. 2. In this particular method of practicing the invention as this dispersion permeates the interior of the cell 10 the polyglycol other similar stablizer used will be contacted so as to insure that the stablizer is present in the regions where a gel is to be formed. Thus, this method of practicing the invention tends to eliminate any question as to whether or not the stablizer is adequately mixed within the electrolyte.

A further method of practicing this invention is indicated in FIG. 4 of the drawing. In this method of practicing the invention two different, separate solutions are mixed together immediately prior to their being sent through the filling opening 14 or are simultaneously injected through the filling opening 14. In both of these cases the normal fluid movement serves to mix these two solutions as they flow so as to penetrate the interior of the cell 10.

In theory it is possible that one of the two solutions used can be a liquid polyethylene glycol. In practice this is not considered advantageous or desirable because of the extremely small quantity of a polyethylene glycol normally used as a gel stabilizer in accordance with this invention. Normally in this method of practicing the invention, one of the solutions used will be a relatively concentrated dispersion of silica in sulfuric acid while the other will be a mixture of the polyglycol stablizer and sulfuric acid. The precise proportions in such two solutions and/or of such two solutions used is relatively immaterial so long as the ultimate electrolyte within a battery is in accordance with the preceding discussion.

In any of these methods of practicing the invention a filled battery will tend to "set up" into a firm, solidified gel within a reasonably short period which is considered adequate in conventional manufacturing procedures. The precise duration of this period will, of course, vary depending upon the specific ingredients used and the relative proportions of such ingredients. In any event, normally batteries created as herein described will gel within a comparatively short time and can be moved without danger of gel damage soon after they are filled. Further the gels created as described are of such a nature that they will withstand significant handling, physical forces and the like without deterioration or breakdown, and can normally be utilized in a battery for prolonged periods without cracking or shrinking.

In practicing the invention it is considered important that the amount of a polyglycol stablizer used be limited to an amount which is effective so as to stablize an electrolyte gelled through the use of silica. The use of an excess of such a stablizer over such an amount not only represents economic waste, but may detrimentally effect electrolyte penetration within the interior of a battery if the excess is of any extremely large character such as two or three times what is required to stablize such a gel. This is because a polyglycol stablizer as herein described in large quantities will also serve to increase the viscosity of a liquid such as sulfuric acid.

If a liquid mixture injected into a battery has a significantly greater viscosity than liquid sulfuric acid it will not tend to adequately fill the battery so as to displace all air within the battery. For this reason it is considered that if an excess of a polyglycol is to be used as a stablizer in accordance with this invention the amount should be sufficient so that the viscosity of a mixture or solution used to fill a battery should not be so great as to cause any easily measurable effect on electrolyte viscosity. However, normally acceptable results can be achieved when the viscosity in filling is not greater than about 20 percent greater than the viscosity of an agitated sulfuric acid—silica dispersion as used to fill a battery—in accordance with known practice.

I claim:

1. In an electric battery having positive and negative electrodes which are separated from one another and a gelled aqueous sulfuric acid electrolyte in contact with said electrodes and electrically connecting said electrodes, said electrolyte being gelled by the use of a silica gelling agent, the improvement which comprises:
said gel containing a polyglycol polymer in an effective amount for said polyglycol polymer to serve as an additive-stablizer for said gelled electrolyte which is adequate to render said gelled electrolyte non-thixotropic in character, said additive-stablizer also serving to decrease the tendency of said gelled electrolyte to physically break down by cracking and shrinking during the continued, repeated use of said battery.

2. An electric battery as claimed in claim 1 wherein:
said polyglycol polymer is a polyethylene glycol polymer.

3. An electric battery as claimed in claim 1 wherein:
said gelled electrolyte contains of from about 3 percent to about 8.5 percent by weight colloidal silica serving as a gelling agent and contains from about 0.065 percent to about 0.0001 percent by weight of said polyglycol polymer.

4. An electric battery as claimed in claim 1 wherein:
said battery includes separator means positioning said electrodes separate and apart from one another, 5. An electric battery as claimed in claim 4 wherein:
said polyglycol polymer is a polyethylene glycol polymer having a molecular weight of from about 800 to about 6,000.
said gelled electrolyte contains of from about 3 percent to about 8.5 percent by weight colloidal silica serving as a gelling agent and contains from about 0.065 percent to about 0.0001 percent by weight of said polyglycol polymer.

6. A process for locating a gelled-aqueous sulfuric acid electrolyte within an enclosed space located within a battery cell which comprises the steps of:
forming a mixture of aqueous sulfuric acid and a silica gelling agent, said mixture containing an effective amount of said silica gelling agent to form a solid thixotropic gel with said sulfuric acid,
injecting said mixture into said space while applying sufficient mechanical stress to said mixture to overcome the thixotropic character of said mixture while contacting said mixture with a polyglycol polymer in an amount effective to render said gelled electrolyte non-thixotropic in character, and
allowing a gel to form from said mixture after it has been contacted by said polyglycol.

7. A process as claimed in claim 6 wherein:
said mixture is injected into said space through an opening;
said polyglycol polymer is in the form of a quanity of solid particles located within said space adjacent to said opening,
said particles being contacted by and mixed with said mixture as said mixture is passed through said opening.

8. A process as claimed in claim 6 wherein:
there are component parts of a battery within said enclosed space,
said polyglycol polymer is located on the surfaces of said parts so as to be contacted with said mixture as said mixture comes in contact with said parts.

9. A process as claimed in claim 6 wherein:
said mixture is contacted with said polyglycol polymer by mixing said polyglycol polymer with said mixture concurrently while injecting said mixture into said space.

10. A process as claimed in claim 6 wherein:
said gelled electrolyte is located within a battery cell having a filling opening and said enclosed space is the interior of said cell,
electrodes and spacer means separating said electrodes both capable of being penetrated by sulfuric acid are located within said cell, and
said polyglycol polymer is polyethylene glycol polymer.

11. A process as claimed in claim 10 wherein:
said polyglycol polymer is in the form of a solid powder located within said filling opening when said mixture is injected into the interior of said battery,
the injection of said mixture into said battery serving to mix said mixture with said polymer,
said polymer and said silica are separated from said sulfuric acid as said mixture is injected into said battery by the physical structure of said electrodes and said spacer means so that said battery contains "free" sulfuric acid within said electrodes and said spacer means and sulfuric acid gelled to a non-thixotropic character in the "free" space within the interior of said battery which is not occupied by said electrodes and said separator means.

12. A process as claimed in claim 10 wherein:
said polyglycol polymer is located in the form of film upon said electrodes and said spacer means as it is contacted by said mixture as said mixture is injected into said battery,
the injection of said mixture into said battery serving to contact said mixture with said polyglycol polymer so that said polyglycol polymer is uniformly present within said electrolyte within the "free space" within the interior of said battery which is not occupied by said electrodes and said separator means,
the physical structure of said electrodes and said spacer means serving to separate sulfuric acid from said silica and said polyglycol polymer as said mixture is injected into said battery so that said battery contains "free" sulfuric acid within said electrodes and said spacer means.

* * * * *